Figure 1:
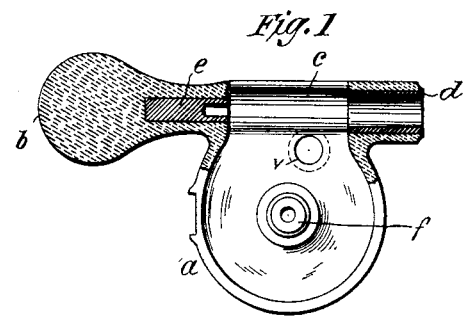

(No Model.)

O. KNAPP.
SPEED MEASURE.

No. 483,846. Patented Oct. 4, 1892.

Witnesses:—
Raphail Netter
J. E. M. Bowen

Inventor:—
Oscar Knapp

UNITED STATES PATENT OFFICE.

OSCAR KNAPP, OF BROOKLYN, NEW YORK.

SPEED-MEASURE.

SPECIFICATION forming part of Letters Patent No. 483,846, dated October 4, 1892.

Application filed May 20, 1892. Serial No. 433,680. (No model.)

*To all whom it may concern:*

Be it known that I, OSCAR KNAPP, a citizen of the United States, and a resident of Brooklyn, in the county of Kings and State of New York, have invented certain new and useful Improvements in Speed-Indicators, of which the following is a specification.

My invention has reference to improvements in devices for indicating the number of revolutions made by a shaft in a given time, commonly known as "speed-indicators."

The object of my invention is to facilitate and cheapen the cost of manufacture and also to simplify the construction of speed-indicators, whereby the advantages hereinafter enumerated are secured.

The accompanying drawings, which form a part of this specification, represent what I consider the best means of carrying out the invention.

The mode of constructing the casings of speed-indicators as now practiced is to cast them in hard metal—such as brass—and finish them after the molding process is completed by suitable mechanism which produces the necessary shaft-bearings, dial-studs, &c. This mode of construction is necessarily expensive, as it requires much time and considerable skill.

An important feature of my invention resides in making the casing of any suitable soft metal that may be cast in molds or of any suitable composition that may be pressed in molds, such as celluloid, rubber, or the like, the soft metal or composition being cast or molded around the hard-metal parts which form the bearings for the spindle and for the dials, the said hard-metal parts being suitably placed and supported in the mold that is prepared to receive the soft metal or composition, so that when the casing comes out of the mold in its finished condition the said hard-metal parts are firmly fixed in position and the casing is in readiness to receive the operative parts of the indicator without any preliminary finishing, such as is necessary with the hard-metal casings as heretofore made. The handle of my device is cast or molded integral with the casing, which is economical and otherwise desirable, and is practicable in my organization, the mechanism of which does not require the transfer of the handle from one end of the spindle to the other in changing from a right to a left hand revolving shaft.

In one type of the device as heretofore constructed the spindle of the speed-indicator was provided with a worm, which was adapted to engage with an interior system of gearing which moved the hands of the dials (or with a worm on the rim of one of the dials) and the two dials—one registering single revolutions up to one hundred and the other indicating the hundreds up to one thousand—were arranged side by side.

My invention relates to another type of the device, in which the dials are arranged one above the other. I arrange the dials on the same axis, which is centrally fixed in the indicator-casing, and provide connection between the two dials, so that they will each move at the proper time to register the indication by means of a spring-pin fixed in the upper dial and projecting through to the dial beneath, the said spring-pin being adapted to co-operate with a depressing-plate fixed to the side of the casing, said plate being of sufficient width to hold the spring-pin depressed long enough to permit the lower dial, with which the pin of the spring engages when depressed, to travel one-tenth of a revolution, and thus effect the registering by the lower dial.

Figure 2:
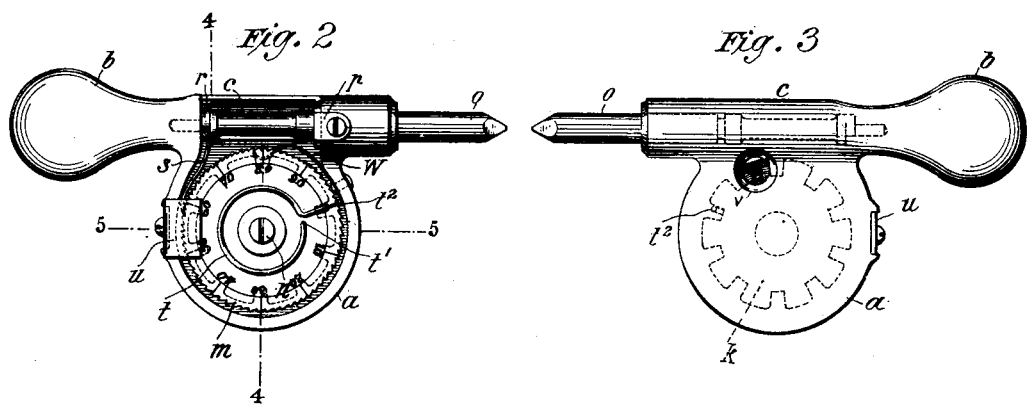
Figure 3:
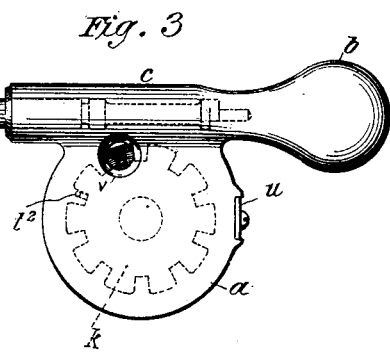
Figure 4:
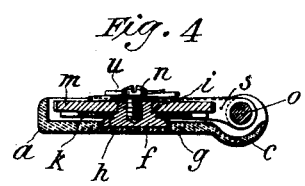
Figure 5:
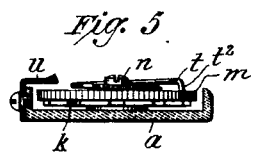
Figure 6:
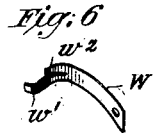

In the accompanying drawings, in the several views of which like parts are indicated by like letters of reference, Figure 1 is an inside plan view of the indicator-casing, partly in section, to illustrate the hard-metal spindle-bearings molded in position. Fig. 2 is a plan view showing the face of the device with the several operative parts assembled within the casing. Fig. 3 is a plan view of the indicator, showing its back surface, the lower dial within the casing being indicated in dotted lines. Fig. 4 is a cross-section on the line 4 4 of Fig. 2. Fig. 5 is a section on the line 5 5 of Fig. 2; and Fig. 6 is a view in perspective of the spring which is riveted in the casing and co-operates with both of the recording-dials, as hereinafter explained.

Referring to the drawings, *a* indicates the indicator-casing, which is preferably of the configuration shown with the dial-receptacle at one side of the handle b and the spindle-support c. The casing a, instead of being made of hard metal—such as brass—is formed of any suitable soft metal that may be cast in molds or of a composition—such as celluloid or rubber—that may be pressed in molds, and in the process of forming the casing the hard-metal bearings d e for the spindle and the hard-metal stud f for the recording-dials are cast in their appropriate places. This is accomplished by suitably supporting said bearings and stud within the mold, so that when the metal or composition is run into the mold the said hard-metal parts will become firmly fixed in the finished casing.

I claim no novelty for the mold in which the casing is made or for the manner in which the hard-metal bearings are supported therein, and any one familiar with the art will readily understand the *modus operandi* of casting said hard-metal parts within the body of the casing.

The bearing e for the sake of security may extend quite a distance into handle b. The stud f, which is centrally located within the casing a, is provided with a beveled base g, which affords security against its displacement after it has been cast in place, and it is also provided with two shoulders or bearing-surfaces h i for the lower and upper dials k m, respectively, which are held in place on said stud by screw n, passing vertically down into the stud, a washer being interposed between the head of said screw and the surface of the upper dial m, as shown. The dials are adapted to revolve easily on their bearings, the screw n, taking into the stud f, serving to prevent upward or downward displacement of the dials without preventing their free rotation.

A soft-metal or composition speed-indicator casing having the hard-metal spindle-bearings and dial-stud cast in the casing in their appropriate positions in the act of making the casing does not require any finishing lathe-work after leaving the mold, but is a complete structure, ready to receive its operative mechanism. I thus save labor and expense and materially reduce the cost of manufacture.

By arranging the dials k m on a single central stud, one over the other, as shown, instead of on separate studs, side by side, I gain the advantage of compactness and small dimensions, thus permitting the device to be carried in the pocket without inconvenience.

I will now describe the means whereby I obtain the requisite movements of the two superimposed recording-dials. The spindle o, with a pointed end, as usual, to take into the revolving shaft, is adapted to revolve in its bearings d e, and is secured in place by means of the bridge-piece p, which is screwed to the hub of bearing d, its bifurcated depending part straddling spindle o within a groove of the spindle, thus preventing the withdrawal of the spindle, while not interfering with its free rotation. The spindle o is provided at its inner end, which fits in bearing e, with an eccentric r, which coacts with a pawl s in the usual manner when the spindle is rotated, the inner end of said pawl being adapted to engage with the teeth in the edge of the upper wheel or dial m, as shown, thus causing the revolutions of spindle o to be transmitted to said dial m, each revolution of the spindle o moving the dial one tooth. The lower dial k, which registers the hundreds up to one thousand and is provided with teeth, as shown in dotted lines of Fig. 3, is caused to move with each complete revolution of the upper dial m, which will then have registered "100," by means of a spring-pin t, which is fixed at one end $t'$ in the face of dial m, with its other end $t^2$ bent downward and reaching through a hole in the rim of said dial m. The bent end $t^2$ is adapted to engage with the teeth of the lower dial k at the proper intervals to cause said lower dial to move the space of one tooth. This operation is effected through the medium of a depressing-plate u, secured by a screw or otherwise to the edge of the casing a. This plate u is preferably secured to the casing in the position shown, as in that position it not only serves its main function of depressing the spring-pin t, but also serves to prevent the pawl from flying up and becoming disengaged from the teeth of the dial m. This is shown in Fig. 2. The depressing-plate u is of such width that after the spring-pin t has passed beneath the same, the edge of said plate being slightly bent upward on the side where the spring passes beneath it, so as to facilitate the entrance of said spring-pin, it will be retained depressed just long enough to cause the lower dial k to travel the distance of one-tenth of a revolution, which will register "100," and the register will be indicated through the opening v in the back of the casing, as seen in Fig. 3. As the spring-pin t is released from beneath the depressing-plate u its point $t^2$ is thrown out of engagement with the lower disk k, and said disk then ceases to revolve, and the relative arrangement of the parts is such that at this moment the proper indicating-numeral is opposite the opening v in the back of the casing a, and a tooth of the lower disk k is immediately beneath the point of the end $t^2$ of spring-pin t in readiness to receive said pin when it is again depressed by passing under plate u.

Within the casing a opposite the depressing-plate u, I rivet a spring W. (Shown detached in Fig. 6.) The function of this spring is twofold. Its member $w'$ is normally adapted to rest in a tooth of the lower disk k, as shown in Fig. 2, to insure said disk stopping at the proper point after the spring-pin t has been released by the depressing-plate u to secure the proper indication on the dial at opening v. When the spring-pin reaches down and takes into a tooth of disk k, the spring W readily yields and is lifted out of the tooth (as said disk starts to revolve) onto the plain surface of the rim of disk $k$, so that said disk moves freely around until released by the spring-pin $t$, passing from beneath the depressing-plate $u$, when said member $w'$ falls into the next tooth of disk $k$ and holds said disk against accidental movement until the spring-pin is again depressed. The other member $w^2$ of spring W co-operates with the teeth of the upper disk $m$ to prevent said disk from moving backward with the backward movement of the pawl $s$. This function of spring W will be clear from an inspection of Fig. 2 of the drawings, which shows the member $w^2$ taking into the teeth of disk $m$, the other member $w'$ of said spring being shown in dotted lines as engaging with a tooth of the lower disk $k$.

The operation of my speed-indicator will be plain from the above description, it being understood, of course, that one hundred revolutions of the spindle $o$ will produce one revolution of the upper disk $m$, and each revolution of said disk $m$ gives one-tenth of a revolution of the lower disk $k$.

Having thus described my invention, what I claim as new, and desire to secure by Letters Patent, is—

1. As a new article of manufacture, a speed-indicator casing composed of soft metal or composition provided with hard-metal wearing parts or bearings for the spindle and dials, substantially as set forth.

2. A speed-indicator casing composed of soft metal or composition with a handle formed integral therewith, provided with spindle and dial bearings of hard metal firmly fixed in their appropriate positions, substantially as set forth.

3. A speed-indicator casing composed of soft metal or composition provided with a hard-metal stud centrally located in the casing and provided with a beveled base to afford security against its displacement, substantially as set forth.

4. In a speed-indicator, a casing provided with spindle-bearings and a centrally-fixed stud provided with two shoulders one above the other, a spindle mounted in said bearings, two registering-dials mounted upon the shoulders of said stud to revolve independently of each other, means for communicating the revolution of the spindle to the upper dial, a spring-pin fixed to the upper dial with its free end projecting through an opening in said dial, and a depressing-plate for said spring-pin secured to the outside of the casing, whereby at each complete revolution of the upper dial said spring-pin passing under the depressing-plate is held depressed to co-operate with the lower dial long enough to permit the latter dial to travel one-tenth of a revolution, said plate also serving, in its position on the outside of the casing, to prevent the means for communicating the revolution of the spindle to the upper dial from becoming disengaged from said dial, substantially as set forth.

5. In a speed-indicator, the combination, with a spindle mounted in bearings in the casing and two dials mounted one above the other on a centrally-located stud of the casing to revolve independently of each other, means for communicating the movement of the spindle to the upper dial, and a connection between the two dials, adapted to become operative to cause the lower dial to move at the proper interval, of a spring fixed in the indicator-casing and having two members which co-operate with the teeth in the rims of the superimposed dials to insure the lower dial stopping at the proper point after the release of the connection between the upper and lower dials and to prevent the upper dial from moving backward with the backward movement of the means which transfers the revolution of the spindle to said upper dial, substantially as set forth.

6. In a speed-indicator, the combination, with a casing provided with spindle-bearings and a centrally-fixed stud, of a spindle seated in said bearings and provided with an eccentric near its inner end, two dials mounted upon said stud to revolve independently of each other, a pawl carried by the spindle and co-operating with the eccentric thereon and in co-operation at its outer end with the teeth in the rim of the upper dial, a spring-pin fixed in the upper dial with its free end projecting through an opening in said dial and adapted to co-operate with the teeth in the lower dial, a plate fixed to the casing and adapted to hold said spring-pin depressed when the upper dial has completed a full revolution long enough to cause the lower dial to travel one-tenth of a revolution, and a spring fixed within the casing and having two members at its free end, one of which co-operates with the teeth in the rim of the lower dial and the other with the teeth in the rim of the upper dial, substantially as set forth.

Signed at New York, in the county of New York and State of New York, this 17th day of May, A. D. 1892.

OSCAR KNAPP.

Witnesses:
J. E. M. BOWEN,
M. C. PINCKNEY.